United States Patent
Braun et al.

(10) Patent No.: US 11,028,238 B2
(45) Date of Patent: Jun. 8, 2021

(54) PROCESS FOR MIXING OLEFIN POLYMER WITH REACTANTS

(71) Applicant: BOREALIS AG, Vienna (AT)

(72) Inventors: Hermann Braun, Linz (AT); Rebeca Reguillo Carmona, Linz (AT); Sascha Kaltenbacher, Linz (AT); Katja Klimke, Abu Dhabi (AE); Udo Muster, Salzburg (AT); Hermann Prokschi, Wartberg ob der Aist (AT)

(73) Assignee: BOREALIS AG, Vienna (AT)

( * ) Notice: Subject to any disclaimer, the term of this patent is extended or adjusted under 35 U.S.C. 154(b) by 289 days.

(21) Appl. No.: 15/564,345

(22) PCT Filed: Apr. 8, 2016

(86) PCT No.: PCT/EP2016/057684
§ 371 (c)(1),
(2) Date: Oct. 4, 2017

(87) PCT Pub. No.: WO2016/162453
PCT Pub. Date: Oct. 13, 2016

(65) Prior Publication Data
US 2018/0142068 A1 May 24, 2018

(30) Foreign Application Priority Data
Apr. 10, 2015 (EP) .................................. 15163194

(51) Int. Cl.
*C08J 3/12* (2006.01)
*B29C 48/29* (2019.01)
(Continued)

(52) U.S. Cl.
CPC ................... *C08J 3/12* (2013.01); *B29B 7/48* (2013.01); *B29B 7/726* (2013.01); *B29B 7/845* (2013.01);
(Continued)

(58) Field of Classification Search
None
See application file for complete search history.

(56) References Cited

U.S. PATENT DOCUMENTS 3,277,227 A * 10/1966 Helmut Kesseler .... B29C 48/08
264/216
4,927,888 A 5/1990 Strait et al.
(Continued)

FOREIGN PATENT DOCUMENTS

CA 1339160 * 7/1997
CN 102731725 A 10/2012
(Continued)

OTHER PUBLICATIONS

Korean Office Action for Patent Application No. 10-2017-7030814, dated Oct. 30, 2018.
(Continued)

*Primary Examiner* — Tae H Yoon
(74) *Attorney, Agent, or Firm* — Tarolli, Sundheim, Covell & Tummino LLP

(57) ABSTRACT

The present invention is directed to a process for producing a modified olefin polymer having increased melt strength in an extruder. The process comprising the steps of: (A) contacting a stream comprising particles of an olefin polymer with a vapour stream of a functionally unsaturated compound in vapour phase thereby producing a first mixed stream; (B) passing the first mixed stream to an extruder; (C) melting the polymer particles of the first mixed stream in the extruder; (D) introducing a stream of a free radical generator either into the first mixed stream or into the extruder; and (E) extruding the first mixed stream and the free radical generator at a temperature which is greater than the decomposition temperature of the free radical generator and the melting temperature of the olefin polymer but less than the
(Continued)

decomposition temperature of the olefin polymer thereby producing the modified olefin polymer in the extruder.

3 Claims, 1 Drawing Sheet

(51) Int. Cl.
*C08F 210/06* (2006.01)
*C08L 23/14* (2006.01)
*B29B 7/48* (2006.01)
*C08F 255/02* (2006.01)
*B29B 7/88* (2006.01)
*B29B 7/72* (2006.01)
*B29B 7/84* (2006.01)
*B29B 9/12* (2006.01)
*B29C 48/285* (2019.01)
*B29C 48/05* (2019.01)
*B29C 48/76* (2019.01)
*C08F 236/06* (2006.01)
*B29B 9/06* (2006.01)

(52) U.S. Cl.
CPC ............... *B29B 7/88* (2013.01); *B29B 9/12* (2013.01); *B29C 48/05* (2019.02); *B29C 48/297* (2019.02); *B29C 48/767* (2019.02); *C08F 210/06* (2013.01); *C08F 236/06* (2013.01); *C08F 255/02* (2013.01); *C08L 23/14* (2013.01); *B29B 7/728* (2013.01); *B29B 9/06* (2013.01)

(56) References Cited

U.S. PATENT DOCUMENTS

| | | | |
|---|---|---|---|
| 6,077,907 A | 6/2000 | Raetzsch et al. | |
| 6,093,750 A * | 7/2000 | Craig | B29B 9/10 521/60 |
| 6,204,348 B1 * | 3/2001 | Raetzsch | C08F 255/02 524/572 |
| 9,169,336 B2 * | 10/2015 | Dagley | D01F 6/06 |
| 2002/0136914 A1 * | 9/2002 | Uchida | B32B 27/08 428/515 |
| 2006/0281859 A1 | 12/2006 | Suzuki et al. | |
| 2012/0127822 A1 * | 5/2012 | Noles, Jr. | B01F 3/0865 366/152.2 |

FOREIGN PATENT DOCUMENTS

| | | |
|---|---|---|
| CN | 107848222 A | 3/2018 |
| DE | 19607481 | 9/1997 |
| EP | 0167404 A2 | 1/1986 |
| EP | 0792894 | 3/1999 |
| EP | 879830 | 1/2002 |
| EP | 1174261 | 1/2002 |
| JP | 4-23814 | 1/1992 |
| JP | H09278917 A | 10/1997 |
| KR | 10-2015-0023772 A | 3/2015 |
| TW | 201238988 | 10/2012 |
| WO | 99/27007 | 6/1999 |
| WO | 2014/016205 A1 | 1/2014 |
| WO | 2014/016206 A1 | 1/2014 |
| WO | WO 2014/016206 A1 * | 1/2014 |
| WO | 2016/124617 A1 | 8/2016 |

OTHER PUBLICATIONS

Japanese Office Action for Patent Application No. 2017-549625, dated Oct. 23, 2018.

Chris Rauwendaal: "Polymer Extrusion", Carl Hanser Verlag, Munich 1986.

C. Jackson and H. G. Barth(C. Jackson and H. G. Barth, "Molecular Weight Sensitive Detectors" in: Handbook of Size Exclusion Chromatography and related techniques, C.-S. Wu, 2nd ed., Marcel Dekker, New York, 2004, p. 103).

G. Saunders, P. A. G: Cormack, S. Graham; D. C. Sherrington, Macromolecules, 2005, 38, 6418-6422.

"Rheotens-Mastercurves and Drawability of Polymer Melts", M. H. Wagner, Polymer Engineering and Sience, vol. 36, pp. 925 to 935, 1996.

Taiwanese Office Action dated Oct. 28, 2016.

Chinese Office Action for Patent Application No. 2019041601820970, dated Apr. 19, 2019.

* cited by examiner

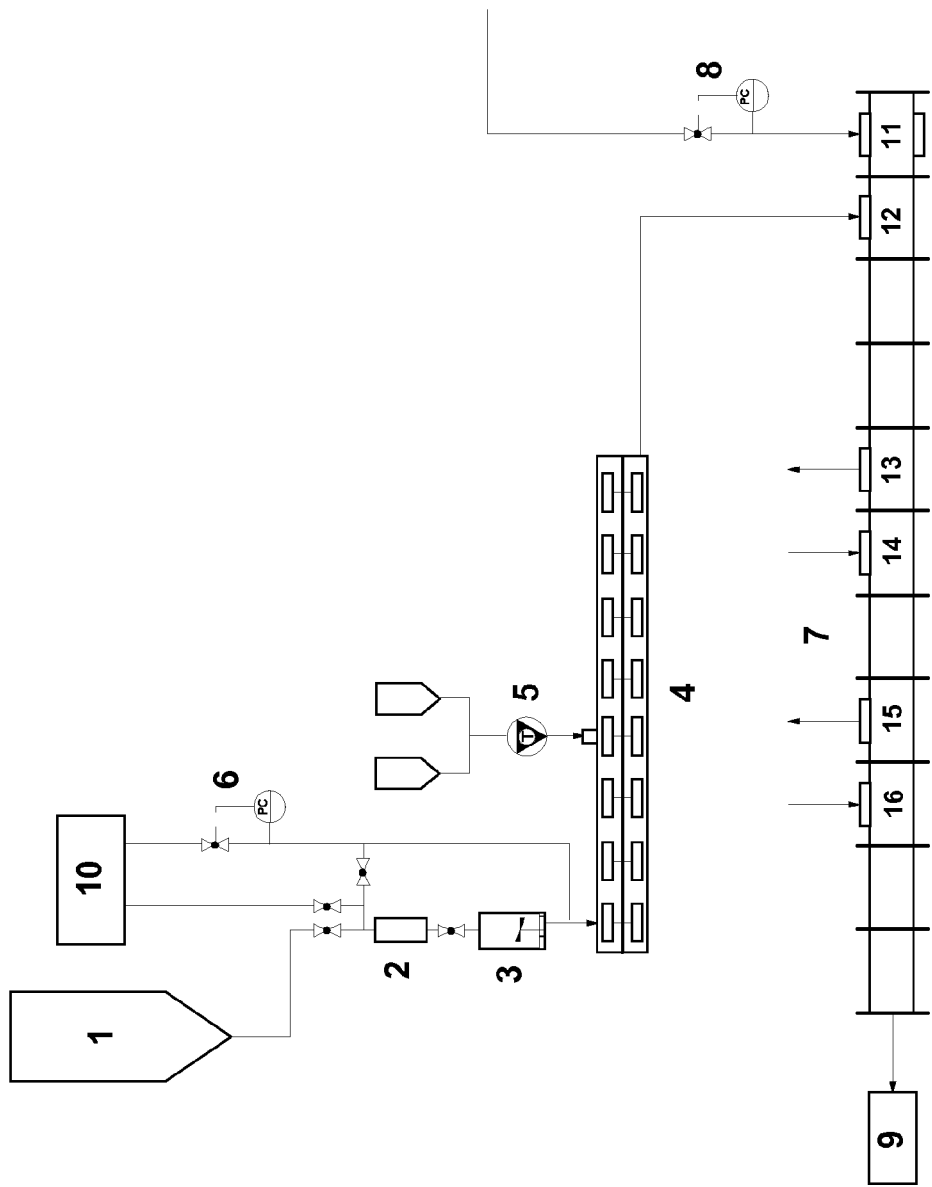

PROCESS FOR MIXING OLEFIN POLYMER WITH REACTANTS

CROSS-REFERENCE TO RELATED APPLICATIONS

This application is a 371 National Stage Application, which claims the benefit of International Application No. PCT/EP2016/057684, filed on Apr. 8, 2016, which claims priority to European Patent Application No. 15163194.2, filed on Apr. 10, 2015, the contents of which are hereby incorporated by references in their entirety.

FIELD OF THE INVENTION

The present invention is directed to an improved process for producing a modified olefin polymer. Especially, the present invention is directed to an improved process for soaking reactants to an olefin polymer in particulate form. In particular, the present invention is directed to a continuous process for mixing a functionally unsaturated compound with a free radical generator in liquid phase and then contacting the liquid mixture with the olefin polymer.

Problem to be Solved

High melt strength polypropylenes (HMS-PP) are generally known in the art. However, the known processes involve several unit operations (multistage processes) for gaining polypropylene with high melt strength, high melt extensibility and low gel content.

EP-A-792894 discloses a multistage process where both thermal decomposable free-radical forming agents, such as peroxide, and an unsaturated monomer were fed in gaseous state downstream of the polymerisation reactor and subsequently were sorbed into solid polyolefin particles. Subsequently the reactive powder mixture containing the thermal decomposable peroxide and the functional monomer was passed to a reaction stage, for instance, in an extruder. The desired decomposition of the thermal free radical generators can be supported by the application of an additional high frequency (HF-) and/or micro-wave (MW-) field beside the thermal heating device.

EP-A-1174261 discloses a process where modified polypropylene was produced by mixing solid polypropylene powder, peroxycarbonate and butadiene were mixed in a continuously operating mixer for an average residence time of about 10 minutes after which the reactive powder mixture was transferred into an extruder.

WO-A-99/27007 relates to a process for enhancing the melt strength of polypropylene in a two-stage-process by (1) mixing the solid polypropylene particles at least with one solid organic based peroxycarbonate and furthermore without an additional coupling agent, and (2) heating up the reactive powder mixture at temperatures between 150 and 300° C., for instance in an extruder. The peroxycarbonate should be present by more than 50%, preferably 80% of the original content at temperatures of at least 120° C., preferably at least 150° C.

U.S. Pat. No. 6,077,907 discloses a process where polypropylene was mixed with a peroxide and butadiene or divinylbenzene in a mixer where the residence time was about 4 minutes. The powder soaked with peroxide and bifunctional monomer was passed to an extruder for producing modified polypropylene.

U.S. Pat. No. 6,204,348 and the corresponding EP-A-879830 disclose in FIG. 1 a process having a continuous premixer for mixing polypropylene powder, a free radical generator and a multifunctional monomer before their introduction into a feed port of an extruder. The thus formed mixture was subjected to modification reactions at temperatures higher than the melting temperature of polypropylene in the extruder for finally achieving long chain branched polypropylene.

JP-A-09278917 discloses a process where a mixture of polypropylene, 1,3-butadiene and a free radical generator was extruded in a twin screw extruder for producing polypropylene foam. The document did not disclose how the components were introduced into the extruder.

One problem with the above-mentioned prior art processes is that they either do not suggest how the components should be contacted with each other or they suggest contacting them in an inferior order. Therefore, the prior art processes do not reach optimal efficiency for the functionally unsaturated compound.

Another problem associated with the prior art processes is that a part of the functionally unsaturated compound is lost in the process. At increased temperature the functionally unsaturated compound is evaporated from the polymer particles in the melting zone of the extruder and lost by backwards flow through the feed hopper. Thereby efficiency becomes low.

Thus, there remains a need in the art for an improved method for producing high melt strength polypropylene (HMS-PP) of consistent and/or improved quality compared to the quality properties of HMS-PP achieved by the process in EP-A-0879830 and other prior art documents.

The present invention aims to overcome the disadvantages of the prior art processes and provide a process which has lower investment and operating costs than the prior art processes and where the emission of chemicals to the environment is reduced.

SUMMARY OF THE INVENTION

The present invention provides a process for producing a modified olefin polymer, said process comprising the steps of: (A) contacting a stream comprising a functionally unsaturated compound and stream comprising a free radical generator thus producing a mixed fluid stream; (B) introducing a stream comprising particles of an olefin into an extruder; (C) introducing the mixed fluid stream into the extruder; (D) melting the stream comprising particles of the olefin polymer in the extruder to produce a melt stream; and (E) extruding the melt stream at a temperature which is greater than the decomposition temperature of the free radical generator and the melting temperature of the olefin polymer but less than the decomposition temperature of the olefin polymer, thereby producing the modified olefin polymer.

DESCRIPTION OF THE FIGURES

FIG. 1 shows a prior art process according to U.S. Pat. No. 6,204,348 for producing modified polyolefins.

DETAILED DESCRIPTION

According to the process of the present invention a modified olefin polymer is produced by a process for producing a modified olefin polymer, said process comprising the steps of: (A) contacting a stream comprising a functionally unsaturated compound and stream comprising a free radical generator thus producing a mixed fluid stream; (B)

contacting the mixed fluid stream with a stream comprising particles of an olefin polymer, thus producing a mixed particulate stream; (C) introducing the mixed particulate stream into an extruder; (D) melting the particles of the olefin polymer of the first mixed stream in the extruder to produce a melt stream; and (E) extruding the melt stream at a temperature which is greater than the decomposition temperature of the free radical generator and the melting temperature of the olefin polymer but less than the decomposition temperature of the olefin polymer, thereby producing the modified olefin polymer.

The present invention deals with a method of producing a modified olefin polymer. The modified olefin polymer has long chain branches attached to the linear olefin polymer backbone. For this reason the terms "modified olefin polymer" and "long chain branched olefin homopolymer or copolymer" are used synonymously in the present application.

Olefin Polymer

The olefin polymer which is used as raw material in the process of the present invention may be any homopolymer or copolymer of an alpha-olefin having from 2 to 10 carbon atoms and mixtures thereof. Preferably, the olefin polymer is selected from the group consisting of: homopolymers of ethylene and copolymers of ethylene with one or more alpha-olefins having from 3 to 10 carbon atoms; homopolymers of propylene and copolymers of propylene with one or more comonomers selected from ethylene and alpha-olefins having from 4 to 10 carbon atoms; homopolymers of 1-butene and copolymers of 1-butene with one or more comonomers selected from ethylene, propylene and alpha-olefins having from 6 to 10 carbon atoms; and homopolymers of 4-methyl-1-pentene and copolymers of 4-methyl-1-pentene with one or more comonomers selected from ethylene, propylene, 1-butene, 1-hexene and alpha-olefins having from 8 to 10 carbon atoms; and mixtures thereof. Especially preferably the olefin polymer is a homopolymer of propylene or a copolymer of propylene with one or more comonomers selected from ethylene and alpha-olefins having from 4 to 10 carbon atoms or a mixture thereof.

The olefin polymer which is used as a raw material in the process of the present invention is generally an essentially linear polymer. By "essentially linear" is meant that the olefin polymer may contain short chain branches having a length of up to 8 carbon atoms, preferably up to 6 carbon atoms, such as from 1 to 4 carbon atoms. However, the long chain branches are substantially absent from the raw material. The presence of long chain branches can be detected according to the methods known in the art, such as by using rheology, by analysing the content of long chain branches by NMR and by measuring the long chain branching parameter g' by GPC. For instance, the value of g' of at least 0.96, such as at least 0.97 or at least 0.98 is an indication that long chain branches are not present. On the other hand, a value of g' of not more than 0.9 indicates that the polymer contains long chain branches. Technically, there is no disadvantage if the olefin polymer contains long chain branches.

The melt flow rate of the olefin polymer may be selected in relatively broad ranges. When the olefin polymer is a homopolymer of propylene or a copolymer of propylene the melt flow rate $MFR_2$ is preferably from 0.1 to 50 g/10 min, more preferably from 0.5 to 40 g/10 min. The melt flow rate $MFR_2$ is measured according to ISO 1133 under a load of 2.16 kg and at a temperature of 230° C. for polypropylene.

As mentioned above, the olefin polymer may be a homo- or copolymer. If the olefin polymer is a copolymer then it preferably contains from 0.1 to 10% by mole of comonomer(s). For example, if the olefin polymer is a copolymer of propylene then it preferably contains from 90 to 99.9% by mole, more preferably from 92 to 99.5% by mole, of units derived from propylene and from 0.1 to 10% by mole, more preferably 0.5 to 8% by mole, of units derived from the comonomer(s).

The olefin polymer may also be a heterophasic copolymer, such as heterophasic copolymer of propylene, where an amorphous phase composed of an elastomeric copolymer is dispersed into a matrix phase formed by a semicrystalline olefin homo- or copolymer, such as semicrystalline propylene homo- or copolymer.

The olefin polymer may be in the form of particles or pellets. Preferably the olefin polymer is in the form of particles. The particles are typically formed in a polymerisation process, such as slurry polymerisation process or gas phase polymerisation process where the olefin is polymerised in the presence of an olefin polymerisation catalyst. After the particles have been recovered from the polymerisation reactor they are subjected to pressure reduction and purging steps to remove the residual hydrocarbons from the polymer. It is desired that the particle size of the polymer is not excessively large to ensure proper melting in the extruder and the bulk density of the powder is suitably high for ensuring acceptable throughput. The median particle diameter is suitably from 50 to 2000 µm, and preferably from 100 to 1500 µm. Furthermore, it is preferred that the bulk density of the powder, measured according to ASTM D1895, is at least 300 kg/m³, more preferably at least 350 kg/m³ and in particular at least 400 kg/m³. By particle diameter is here normally meant the volume surface diameter, unless otherwise stated.

Free Radical Generator

The free radical generator is a compound which is capable of producing free radicals. Typically the free radical generator decomposes and the decomposition products are free radicals. Generally peroxides are used as thermally decomposing free radical generators. Preferably the free radical generator is selected from the group comprising acyl peroxide, alkyl peroxide, hydroperoxide, perester, peroxycarbonate and mixtures thereof. The following listed peroxides are particularly preferred:

a) acyl peroxides (ACPER): benzoyl peroxide, 4-chlorobenzoyl peroxide, 3-methoxybenzoyl peroxide and/or methyl benzoyl peroxide.

b) alkyl peroxides (ALPER): allyl t-butyl peroxide, 2,2-bis (t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

c) peresters and peroxy carbonates (PER): butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butylperoxy isopropyl carbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical forming agents. So for example the following combinations are possible:

i) ACPER and ALPER
ii) ACPER and PER
iii) ALPER and PER
iv) ACPER and ALPER and PER The person skilled in the art knows how to choose the appropriate thermally decomposing free radical forming agent that will thermally decompose during the reactive modification process according to the present invention.

In the reactive modification process according to the present invention for the production of a modified olefin polymer, the olefin polymer is suitably mixed with 0.1 to 2.00 parts per weight (ppw) of the free radical generator per 100 parts per weight of the olefin polymer, preferably mixed with 0.300 to 1.5 parts per weight (ppw) of the free radical generator per 100 parts per weight of the olefin polymer, more preferably mixed with 0.50 to 1.0 parts per weight (ppw) of free radical generator per 100 parts per weight of the olefin polymer. In a preferred way of working the olefin polymer is mixed with 0.250 to 1.00 parts per weight (ppw) of acyl peroxide, alkyl peroxide, hydro peroxide, perester and/or peroxycarbonate per 100 parts per weight of the olefin polymer, preferably with 0.250 to 1.00 parts per weight (ppw) of acyl peroxide, alkyl peroxide, perester and/or peroxycarbonate per$^{100}$ parts per weight of the olefin polymer. The amount of the free radical generator is calculated based on the total amount of the olefin polymer.

The Functionally Unsaturated Compound

The functionally unsaturated compound can be chosen from:
a) a bifunctionally unsaturated monomer and/or polymer or
b) a multifunctionally unsaturated monomer and/or polymer or
c) a mixture of (a) and (b).

"Bifunctionally unsaturated or multifunctionally unsaturated" as used above means the presence of respectively two or more non-aromatic double bonds. Generally, only those bifunctionally or multifunctionally unsaturated compounds are used that can be polymerised with the aid of free radicals.

Preferably the bifunctionally unsaturated monomers are chosen from:
divinyl compounds, such as for example divinylaniline, m-divinylbenzene, p-divinylbenzene, divinylpentane and divinylpropane;
allyl compounds, such as for example allyl acrylate, allyl methacrylate, allyl methyl maleate and allyl vinyl ether;
dienes, such as for example 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis (maleimide), bis (citraconimide);
and mixtures of any of these unsaturated monomers.

Especially preferred bifunctionally unsaturated monomers are 1,3-butadiene, isoprene, dimethyl butadiene and divinylbenzene. The bifunctionally unsaturated polymers are preferably polymers comprising at least one of the above mentioned bifunctionally unsaturated monomers. The multifunctionally unsaturated polymer contains more than one unsaturated monomer as described above. Examples of such polymers including oligomers are polybutadiencs, especially where the different microstructures in the polymer chain, i.e. 1,4-cis, 1,4-trans and 1,2-(vinyl) are predominantly in the 1,2-(vinyl) configuration copolymers of butadiene and styrene having 1,2-(vinyl) in the polymer chain.

A preferred polymer is polybutadiene, in particular a polybutadiene having more than 50.0 wt % of the butadiene in the 1,2-(vinyl) configuration. The 1,2-(vinyl) configuration is determined by $^1$H and $^{13}$C NMR spectroscopy.

Preferably the functionally unsaturated compound is a bifunctionally unsaturated monomer or a multifunctionally unsaturated monomer.

In the reactive modification process according to the present invention for the production of a modified olefin polymer optionally at least one functionally unsaturated compound is used next to the at least one thermally decomposing free radical-forming agent. Usually not more than three different functionally unsaturated compounds are used; preferably one functionally unsaturated compound is used in the reactive modification process according to the invention.

The term "functionally unsaturated compound" denotes the functionally unsaturated compounds that have been previously defined. Generally the functionally unsaturated compound can be used in a concentration of 0.05 to 2.5 parts per weight (ppw) of functionally unsaturated compound per 100 parts per weight of olefin homopolymer and/or copolymer, preferably in a concentration of 0.05 to 1.5 parts per weight (ppw) of functionally unsaturated compound per 100 parts per weight of olefin homopolymer and/or copolymer, more preferably in a concentration of 0.1 to 1.0 parts per weight (ppw) of functionally unsaturated compound per 100 parts per weight of olefin homopolymer and/or copolymer The amount of functionally unsaturated compound is calculated based on the total amount of olefin homopolymer and/or copolymer.

Preparation of Fluid Mixture

According to the process of the present invention the functionally unsaturated compound and the free radical generator are combined to a mixed fluid stream. The mixed fluid stream comprises the functionally unsaturated compound and the free radical generator in desired content for producing the modified olefin polymer. In addition, the mixed fluid stream may comprise one or more inert compounds, such as saturated hydrocarbons, for diluting the functionally unsaturated compound and the free radical generator to suitable concentrations. The inert compounds are suitably saturated hydrocarbons which are liquids at the temperature and pressure of the mixed fluid stream, such as alkanes or cycloalkanes having from 5 to 20, preferably 5 to 15 carbon atoms, or aryl, alkylaryl or arylalkyl compounds having from 6 to 20, preferably 6 to 15 carbon atoms.

The mixed fluid stream may be produced according to any suitable method known in the art. According to one such method the streams of the functionally unsaturated compound and the free radical generator are passed to an inlet of a static mixer, preferably in liquid state, and the mixed fluid stream is withdrawn from the outlet of the static mixer.

According to another method the streams of the functionally unsaturated compound and the free radical generator are passed to a gas-liquid or liquid-liquid absorber. From the absorber the mixed fluid stream may still be passed to a static mixer.

The pressure and temperature of the mixed fluid stream are such that the stream remains in one phase, preferably in liquid phase.

The mixed fluid stream may then be transferred by suitable means, like by using a centrifugal pump or a piston pump, to come into contact with the stream of particles of the olefin polymer. As a result of the contacting a mixed particulate stream is formed. Alternatively, the mixed fluid stream may be transferred directly to the extruder.

Mixer

The process may comprise, and preferably comprises, a mixer for achieving a uniform concentration of the functionally unsaturated compound and the free radical generator within the particles of the olefin polymer. The particles are moved from the upstream end of the mixer to the downstream end of the mixer.

The mixed fluid stream and the stream of the particles of the olefin polymer may be contacted upstream of the mixer or within the mixer. When they are contacted in the mixer then they are preferably contacted in the upstream part of the mixer. This allows sufficient time for the liquid components for penetrating the particles of the olefin polymer. The residence time of the particles of the olefin polymer in the mixer is from 30 seconds to 60 minutes, preferably from 1 to 25 minutes such as from 1 to 10 minutes.

The stream of the olefin polymer enters the upstream part of the mixer. For the effective use of the volume of the mixer it is preferred that the stream of the olefin polymer enters the mixer at the upstream end or close to it, such as at a location within the distance of from 0 to 0.3·L, preferably within the distance of from 0 to 0.2·L from the upstream end of the mixer, where L is the overall length of the mixer.

If the mixed fluid stream and the stream of the particles of the olefin polymer are contacted in the mixer then the mixed fluid stream is preferably introduced into the mixer at a location which is within the distance of from 0 to 0.3~L, preferably within the distance of from 0 to 0.2·L from the upstream end of the mixer, where L is the overall length of the mixer.

It is, however, possible to introduce the stream of the olefin polymer and the mixed fluid stream to other locations as described above, provided that the residence time of the particles of the olefin polymer which are in contact with the functionally unsaturated compound in the mixer is within the limits defined above, i.e., from 30 seconds to 60 minutes, preferably from 1 minute to 25 minutes.

The temperature in the mixer is less than the melting temperature of the olefin polymer. It is further preferred that the temperature in the mixer does not exceed the Vicat softening temperature of the polymer. The temperature is preferably at a level where the functionally unsaturated compound does not evaporate from the mixed particulate stream. It is especially preferred that the temperature within the mixer is from 0 to 60° C., more preferably from 20 to 60° C.

The pressure within the mixer is not critical. In many instances it may be preferred to operate the mixer at atmospheric pressure or at a pressure which is close to the atmospheric pressure, such as from 0.8 to 2 bar (absolute pressure).

The particles of the olefin polymer and the mixed fluid stream are mixed in the mixer to form the mixed particulate stream. The mixing may be obtained by any suitable method known in the art. According to one embodiment the mixer comprises one or more agitators, such as paddle agitators or helix agitators, which mixes the particulate polymer with the mixed fluid stream. According to another embodiment the mixer has a vibrating base which fluidises the particles thereby mixing them with the mixed fluid stream. In each case, the mixed particulate stream then travels from the upstream end of the mixer to the downstream end of the mixer.

Extruder

The process according to the present invention is suitably carried out in melt mixing equipment known to a person skilled in the art. Preferably, an extruder or kneader is used.

The extruder may be any extruder known in the art. The extruder may thus be a single screw extruder, a twin screw extruder, such as a co-rotating twin screw extruder or a counter-rotating twin screw extruder, or a multi-screw extruder, such as a ring extruder. Especially preferably the extruder is a co-rotating twin screw extruder. Such extruders are well known in the art and are supplied, for instance, by Coperion, Japan Steel Works, Krauss Maffei Berstorff or Leisteritz.

The extruder typically comprises a feed zone, a melting zone, a mixing zone and a die zone. Further, the melt pressed through the die is typically solidified and cut to pellets in a pelletiser.

The extruder typically has a length over diameter ratio, L/D, of from about 6:1 to about 65:1, preferably from about 8:1 to 60:1. As it is well known in the art the co-rotating twin screw extruders usually have a greater L/D than the counter-rotating twin screw extruders.

The extruder may have one or more evacuation, or vent, ports for removing gaseous components from the extruder. Such gaseous components may include unreacted functionally unsaturated compound, unreacted free radical generator or decomposition products thereof. Such evacuation port should be placed in a sufficient downstream location for allowing sufficient reaction time for the free radical generator and the functionally unsaturated compound with the olefin polymer. Suitably the evacuation port can be located within the downstream end of the melting zone or within the mixing zone.

A stripping agent, such as water, steam or nitrogen, is suitably added to the extruder to assist in removing the volatile components, such as unreacted functionally unsaturated compound, from the polymer melt. Such stripping agent, when used, is added upstream of the evacuation port or upstream of the most downstream evacuation port, if there are multiple evacuation ports.

The extruder may also have one or more feed ports for feeding further components, such as polymer, additives and the like, into the extruder. The location of such additional feed ports depends on the type of material added through the port.

Feed Zone

The polymer is introduced into the extruder through a feed zone. The feed zone directs the particulate polymer into the melting zone. Typically the feed zone is formed of a feed hopper and a connection pipe connecting the hopper into the melting zone. Usually the polymer flows through the feed zone under the action of gravity, i.e., generally downwards. The residence time of the polymer (and other components) in the feed zone is typically short, normally not more than 30 seconds, more often not more than 20 seconds, such as not more than 10 seconds. Typically the residence time is at least 0.1 seconds, such as one second.

If the mixer is not present in the process then the feed zone of the extruder may serve as the location where the mixed fluid stream and the stream of particles of the olefin polymer are contacted. If the feed zone of the extruder serves for contacting the streams then the particles of the olefin polymer and the mixed fluid stream are preferably introduced into the feed hopper.

Melting Zone

The mixed particulate stream passes from the feed zone to a melting zone. In the melting zone the particulate polymer melts. The solid polymer particles are conveyed by drag caused by the rotating screw. The temperature then increases along the length of the screw through dissipation of frictional heat and increases to a level above the melting temperature of the polymer. Thereby the solid particles start to melt.

It is preferred that the screw in the melting zone is designed so that the screw in the melting zone is completely filled. Thereby the solid particles form a compact bed in the melting zone. This happens when there is sufficient pressure generation in the screw channel and the screw channel is fully filled. Typically the screw in the melting zone comprises conveying elements without substantial backwards flow. However, in order to achieve compact bed some barrier or back-mixing elements may need to be installed at a suitable location, for instance, close to the downstream end of the melting zone. The screw design for obtaining a compact particle bed is well known in the extruder industry. The problem is discussed, among others, in paragraphs 7.2.2 and 8.6.2 of Chris Rauwendaal: "Polymer Extrusion", Carl Hanser Verlag, Munich 1986.

It is possible to introduce the mixed fluid stream directly to the melting zone. Suitably the stream is introduced into the melting zone by spraying the stream in liquid form into the melting zone. Spraying nozzles may suitably be used in spraying the free radical generator or the functionally unsaturated monomer into the melting zone.

Due to frictional heat the temperature increases along the length of the screw and the polymer starts to melt. The melting behaviour is discussed, for instance, in the above-mentioned book of Chris Rauwendaal, in the paragraph 7.3, especially in 7.3.1.1, and 7.3.2.

Mixing Zone

After the melting zone the polymer passes to a mixing zone. The screw in the mixing zone typically comprises one or more mixing sections which comprise screw elements providing a certain degree of backward flow. In the mixing zone the polymer melt is mixed for achieving a homogeneous mixture. The mixing zone may also comprise additional elements, such as a throttle valve or a gear pump.

The temperature in the mixing zone is greater than the melting temperature of the olefin polymer. Further, the temperature needs to be greater than the decomposition temperature of the free radical generator. The temperature needs to be less than the decomposition temperature of the olefin polymer. Suitably, the temperature is from about 5° C. greater than the melting temperature of the olefin polymer, preferably from about 10° C. greater than the melting temperature of the olefin polymer to preferably about 300° C., more preferably about 280° C. and especially preferably to about 240° C. For instance, for some propylene homopolymers the temperature should be preferably at least 165° C., more preferably at least 170° C.

It is also possible to introduce the mixed fluid stream directly to the mixing zone. Suitably the stream is introduced into the mixing zone by spraying the stream in liquid form into the mixing zone. Spraying nozzles may suitably be used in spraying the free radical generator or the functionally unsaturated monomer into the mixing zone. Suitably, the mixed fluid stream is then introduced to the upstream end of the mixing zone.

The decomposition of the free radical generator starts in the melting zone, if the free radical generator is present in the melting zone, and continues in the mixing zone. The thus formed free radicals react with the polymer chains and especially tertiary carbon atoms and double bonds therein, thus creating polymer radicals. These polymer radicals may react with the double bonds of the functionally unsaturated compound, thus creating polymer chains with double bonds. These double bonds in the polymer chain may further react with other polymeric radicals thus forming long-chain branched polymer.

The overall average residence time in the combined melting zone and the mixing zone of the extruder should be preferably at least about 25 seconds and more preferably at least about 30 seconds. Typically the average residence time does not exceed 60 seconds and preferably it does not exceed 55 seconds. Good results have been obtained when the average residence time was within the range of from 30 to 45 seconds.

As it was discussed above, it is preferred to remove gaseous material from the extruder via one or more evacuation ports or, as they are sometimes called, vent ports. The gaseous material is typically unreacted functionally unsaturated compound or degradation products of the free radical generator. Venting of gaseous material from the extruder is well known in the industry and is discussed, for instance, in the above-mentioned book of Chris Rauwendaal, in paragraphs 8.5.2 and 8.5.3.

It is possible to use more than one evacuation port. For instance, there may be two ports, an upstream port for crude degassing and a downstream port for removing the remaining volatile material. Such an arrangement is advantageous if there is large amount of gaseous material in the extruder.

The vent ports are suitably located in the mixing zone. However, they may also be located at the downstream end of the melting zone. Especially if there are multiple vent ports it is sometimes advantageous to have the most upstream port within the melting zone and the subsequent port(s) in the mixing zone.

It is also possible to add a stripping agent, such as water, steam, $CO_2$ or $N_2$, into the extruder. Such stripping agent, when used, is introduced upstream of the vent port or, when there are multiple vent ports, upstream of the most downstream vent port and downstream of the upstream vent port. Typically the stripping agent is introduced into the mixing zone or at the downstream end of the melting zone. Stripping is discussed, among others, in paragraph 8.5.2.4 of the book of Chris Rauwendaal.

Die Zone

The die zone typically comprises a die plate, which is sometimes also called breaker plate and which is a thick metal disk having multiple holes. The holes are parallel to the screw axis. The molten olefin polymer is pressed through the die plate. The molten polymer thus forms a multitude of strands. The strands are then passed to the pelletiser.

The function of the die plate is to arrest the spiralling motion of the polymer melt and force it to flow in one direction.

The die zone may also comprise one or more screens which are typically supported by the die plate. The screens are used for removing foreign material from the polymer melt and also for removing gels from the polymer. The gels are typically undispersed high molecular weight polymer, for instance, cross-linked polymer.

Pelletiser

The strands of molten polymer are passed through the die plate into the pelletiser. Usually, the pelletiser comprises a water bath and a set of rotating knives adjacent to the die plate. The strands are cooled and solidified in the water and the rotating knives cut the strands to pellets. The size of the pellets can be adjusted by selecting a suitable number of knives and a suitable rotation speed.

The water temperature in the pelletiser is typically from 20 to 90° C., and preferably from 30 to 70° C. A stream of water, into which the pellets are suspended, is withdrawn from the pelletiser. The pellets are separated from the water stream after which they are dried and recovered. The water stream is passed to a cooling step and returned into the pelletiser. Optionally, fresh water is added to the water stream for compensating losses.

FIGURES

FIG. 1 discloses a prior art process which is used for producing the modified polyolefins. The reference numbers in this FIG. 1 have the following meanings.
1 Intermediate storage bin for olefin polymer
2 Product transfer tube
3 Metering device for solids
4 Continuous heatable flow-through mixer
5 Dosing pump for radical generating agent
6 Gas pressure control
7 Twin screw extruder
8 Quantity control for monomer metering
9 Granulating equipment (pelletiser)
10 Waste gas purification
11 Special housing with connecting piece for supplying the gas
12 Special housing with connection piece for supplying the powdery reaction mixture into the extruder (feed hopper)
13 Special housing with connecting piece for degassing (evacuation or vent port)
14 Special housing with connecting piece for metering-in the entraining agent
15 Special housing with connecting piece for final degassing (evacuation or vent port)
16 Special housing with connecting piece for metering additional material The olefin polymer passes from the intermediate storage bin (1) over a product transfer tube (2) and a solids metering device (3) to a continuous, heatable flow-through mixer (4), which has a high homogenizing effect during the mixing of the polypropylene particles with the optionally added thermally decomposing free radical generator.

The free radical generator is transported with the metering pump (5) to an apparatus for atomizing the liquid and sprayed onto the fluidized bed produced by mechanically mixing the polymer powder in the flow-through mixer (4), in which the bifunctional, unsaturated monomers in the gas phase are absorbed by the olefin polymer particles.

The gas mixture containing the functionally unsaturated compound is metered over a quantity controller (6), the set point of which is fixed as a function of a mass pressure or the melt index. The gaseous functionally unsaturated compound is passed into a special housing (11) of the twin screw extruder (7), upstream of the feed hopper (12) for the powdery reaction mixture, and flows counter-currently to the powder through the feed hopper (12) into the continuously heatable through-flow mixer (4). In the addition pipe (2) and the metering device (3) of the flow-through mixer (4), the functionally unsaturated compound mixes with inert gas or oxygen or inert gas/oxygen mixtures carried in with the powder. The gas mixture flows over a pressure control (6) to the waste gas purification system (10).

The gas mixture containing the functionally unsaturated compound can optionally be circulated by a compressor circulating pump.

The twin screw extruder (7), which is fitted at the special housing (11) with a connecting piece for supplying gas, makes it possible to heat and melt the modified olefin polymer, supplied over the connecting piece (12), between the connecting pieces (12) and (13) in the presence of the functionally unsaturated compound.

The connecting piece (13) serves for removing most of the gases from the modified olefin polymer. The twin screw extruder is equipped with a connecting piece for metering-in the entraining agent (14). Downstream of the connecting piece (14) there is a second connecting piece (15) for degassing where the remaining unreacted functionally unsaturated compound is withdrawn from the extruder (7). Optionally, further auxiliary materials, such as additives, can be added over the feed port (16). The downstream granulating equipment (9) brings about the comminution of the melt extrudate.

Measuring Methods

The following definitions of terms and determination methods apply for the above general description of the invention as well as to the below examples unless otherwise defined.

Melt Flow Rate

The melt flow rate (MFR) or melt index (MI) is measured according to ISO 1133. Where different loads can be used, the load is normally indicated as the subscript, for instance, $MFR_2$ which indicates 2.16 kg load. The temperature is selected according to ISO 1133 for the specific polymer, for instance, 230° C. for polypropylene and 190° C. for polyethylene. Thus, for polypropylene $MFR_2$ is measured at 230° C. temperature and under 2.16 kg load.

Molecular Weight Averages, Molecular Weight Distribution, Long Chain Branching Index (Mn, Mw, MWD, g') Determined by SEC/VISC-LS Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µL of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 $cm^3/g$.

The molar mass at each elution slice was determined by light scattering using a combination of two angels 15° and 90°. All data processing and calculation was performed using the Cirrus Multi-Offline SEC-Software Version 3.2 (Polymer Laboratories a Varian Inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the Mwi at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in: Handbook of Size Exclusion Chromatography and related techniques, C.-S. Wu, $2^{nd}$ ed., Marcel Dekker, New York, 2004, p. 103). For the low and high molecular region in which less signal of the LS detector or RI detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample.

The relative amount of branching is determined using the g'-index of the branched polymer sample. The long chain branching (LCB) index is defined as $g'=[\eta]_{br}/[\eta]_{lin}$. It is well known if the g' value increases the branching content decreases. [η] is the intrinsic viscosity at 160° C. in TCB of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector.

$[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\Sigma_0^i a_i * \frac{[\eta]_{br,i}}{[\eta]_{lin,i}}}{\Sigma a_i}$$

Where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}=K*M_i^\alpha$. $[\eta]_{br,i}$ was measured for each particular sample by online viscosity and concentration detector.

gpcBR Index:

The gpcBR index is calculated by using the following formula:

$$gpc_{BR} = \left[\left(\frac{[\eta]_{lin}}{[\eta](bulk)}\right)\right] \cdot \left[\frac{M_w(LS15)}{M_{w,lin}}\right]^\alpha - 1$$

Where the Mw (LS15) is calculated from the light scattering elution area of 15° angle and [η] (bulk) from the corresponded viscosity detector elution area by using the Cirrus Multi-Offline SEC-Software Version 3.2 and the following approach.

$$M_w(LS15) = \frac{K_{LS} \cdot \text{Area}_{LS15-det}}{\frac{dn}{dc} \cdot \text{Area}_{RI-det}}$$

$$[\eta](bulk) = K_{IV} \cdot \frac{\Sigma nSp_i}{C} (dl/g)$$

Where $K_{LS}$ is the light scattering constant of 15° angle, dn/dc is the refractive index increment as calculated from the detector constant of the RI detector, $K_{IV}$ is the detector constant of the viscometer, $Sp_i$ is the specific viscosity at each chromatographic slice and C is the corresponded concentration in g/dl. Initially the molecular weight and intrinsic viscosity for the linear polypropylene standard sample are determined using universal calibration approach applying the corresponded Mark Houwink constants for linear PP ("linear") for both molecular weight and intrinsic viscosity as a function of elution volume using the corresponded equations:

$$[\eta]_{lin}=\Sigma w_i \cdot IV_{lin,i}$$

Gel Content

About 2 g of the polymer ($m_p$) are weighed and put in a mesh of metal and the combined weight of the polymer and the mesh is determined ($m_p$+m). The polymer in the mesh is extracted in a soxhlet apparatus with boiling xylene for 5 hours. The eluent is then replaced by fresh xylene and the boiling is continued for another hour. Subsequently, the mesh is dried and weighed again for obtaining the combined mass of hot xylene insoluble polymer (XHU) and the mesh ($m_{XHU}$+m). The mass of the xylene hot insoluble polymer ($m_{XHU}$) obtained by the formula ($m_{XNU}$+m)−m=$m_{XHU}$ is put in relation to the weight of the polymer ($m_p$) to obtain the fraction of xylene insoluble polymer $m_{XHU}/m_p$. This fraction of xylene insoluble polymer is then taken as the gel content.

F30 and F200 Melt Strength and v30 and v200 Melt Extensibility

The test described herein follows ISO 16790:2005. An apparatus according to FIG. 1 of ISO 16790:2005 is used.

The strain hardening behaviour is determined by the method as described in the article "Rheotens-Mastercurves and Drawability of Polymer Melts", M. H. Wagner, Polymer Engineering and Sience, Vol. 36, pages 925 to 935. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). For measuring F30 melt strength and v30 melt extensibility, the pressure at the extruder exit (=gear pump entry) is set to 30 bars by by-passing a part of the extruded polymer. For measuring F200 melt strength and v200 melt extensibility, the pressure at the extruder exit (=gear pump entry) is set to 200 bars by by-passing a part of the extruded polymer.

The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec2. The Rheotens was operated in combination with the PC program EXTENS. This is a real-time data-acquisition program, which displays and stores the measured data of tensile force and drawdown speed. The end points of the Rheotens curve (force versus pulley rotary speed), where the polymer strand ruptures, are taken as the F30 melt strength and v30 melt extensibilty values, or the F200 melt strength and v200 melt extensibilty values, respectively.

Particle Size and Particle Size Distribution

A gradation test was performed on the polymer samples. The sieve analysis involved a nested column of sieves with wire mesh screen with the following sizes: >20 µm, >32 µm, >63 µm, >100 µm, >125 µm, >160 µm, >200 µm, >250 µm, >315 µm, >400 µm, >500 µm, >710 µm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve.

EXAMPLES

The following peroxide solution was used in the examples:

Peroxide solution 1: 75% by weight free radical generator having a half-life at 160° C. of from 25 to 45 seconds (density about 0.90 g/ml);

The following polymers were used in the examples:

Polymer 1: Polypropylene homopolymer in powder form having $MFR_2$ of 0.6 g/10 min and a median particle size of 0.23 mm.

Polymer 2: Polypropylene homopolymer in pellet form having $MFR_2$ of 0.8 g/10 min and a pellet size of about 3.9 mm.

Polymer 3: Polypropylene homopolymer in powder form having $MFR_2$ of 0.8 g/10 min and a median particle size of 1.55 mm.

An additive package containing 17% by weight of Ca-stearate, 17% by weight of synthetic hydrotalcite and the reminder of Irganox B 215 was mixed with the polymer which was introduced to the additive feed port in all examples.

Example 1

A ZSK 30 co-rotating twin screw extruder having L/D of 38 was used for reactive extrusion as follows. Powder was fed at a distance of L/D 1.5 from the upstream end of the screw. Peroxide and/or butadiene feed points were at L/D of 8 and 12 from the upstream end of the screw. Additive feed was at L/D of 24 and vacuum port was at L/D of 33. In the range of L/D from 9 to 24 the screw contained mixing elements whereas from 1 to 9 and 24 to 38 conveying elements. The barrel temperatures were about 110° C. in the upstream end of the melting zone, from 180° C. to 200° C. in the mixing zone and about 220° C. at the die. The vacuum was set to −0.25 bar g.

Polymer 3 was introduced into the feed port of the extruder. Into the liquid feed port at L/D of 8 were introduced 1,3-butadiene and Peroxide solution 1 as described above so that the feed rates of the peroxide solution and butadiene were 0.70% by weight and 0.24% by weight of the combined feed of the propylene homopolymer, butadiene and peroxide solution, respectively. The peroxide solution and butadiene feeds were combined in a feed pipe so that the residence time of the combined feed in the pipe was about 15 minutes. The polymer feed rate was 8 kg/h.

The resulting polymer had $MFR_2$ of 3.1 g/10 min and the fraction of hot xylene unsoluble material of 0.46%. The data is summarised in Table 1.

Example 2

The procedure of Example 1 was repeated except that Polymer 1 was used as the polymer raw material. The feed rates of Peroxide solution 1 and 1,3-butadiene were as shown in Table 1.

Example 3

The procedure of Example 1 was repeated except that Polymer 2 was used as the polymer raw material.

The feed rates of Peroxide solution 1 and 1,3-butadiene were as shown in Table 1.

Comparative Example 1

The extruder described in Example 1 was operated as described in Example 1 with the following exceptions.

Polymer 3 was introduced into the feed port of the extruder together with Peroxide solution 1. 1,3-butadiene was introduced into the liquid feed port at L/D of 8. The feed rates of the peroxide solution and butadiene were 0.74% by weight and 0.22% by weight of the combined feed of the propylene homopolymer, butadiene and peroxide solution, respectively. The polymer feed rate was 8 kg/h.

The resulting polymer had $MFR_2$ of 1.6 g/10 min and the fraction of hot xylene unsoluble material of 0.74%. The data is summarised in Table 1.

Comparative Example 2

The extruder described in Example 1 was operated as described in Example 2 with the following exceptions.

Polymer 1 was introduced into the feed port of the extruder. Peroxide solution 1 was introduced into the liquid feed port at L/D of 8. 1,3-butadiene was introduced into the liquid feed port at L/D of 12. The feed rates of the peroxide solution and butadiene were 0.46% by weight and 0.43% by weight of the combined feed of the propylene homopolymer, butadiene and peroxide solution, respectively. The polymer feed rate was 8 kg/h.

The data is summarised in Table 1.

Comparative Example 3

The extruder described in Example 1 was operated as described in Example 3 with the following exceptions.

Polymer 2 was introduced into the feed port of the extruder. Peroxide solution 1 was introduced into the liquid feed port at L/D of 8. 1,3-butadiene was introduced into the liquid feed port at L/D of 12. The feed rates of the peroxide solution and butadiene were 0.46% by weight and 0.40% by weight of the combined feed of the propylene homopolymer, butadiene and peroxide solution, respectively. The polymer feed rate was 8 kg/h.

The data is summarised in Table 1.

Comparative Example 4

The procedure described in Comparative Example 3 was repeated with the exception that the peroxide solution was introduced to the feed hopper of the extruder and the feed rates of the peroxide solution and the butadiene were changed. Further, the data is summarised in Table 1.

TABLE 1

| Example | PP | POX | Pox amount [wt %] | BD amount [wt %] | $MFR_2$ [g/10 min] | XHU [wt %] | $SHI_{3/100}$ [—] |
|---------|----|-----|-------------------|------------------|--------------------|------------|-------------------|
| 1  | 3 | 1 | 0.70 | 0.24 | 3.1 | 0.46 | 34 |
| C1 | 3 | 1 | 0.74 | 0.22 | 1.6 | 0.74 | 60 |
| 2  | 1 | 1 | 0.48 | 0.20 | 2.5 | 0.18 | 33 |
| C2 | 1 | 1 | 0.46 | 0.43 | 1.6 | 0.58 | 36 |
| 3  | 2 | 1 | 0.47 | 0.34 | 1.4 | 0.44 | 33 |
| C3 | 2 | 1 | 0.46 | 0.40 | 1.6 | 1.18 | 37 |
| C4 | 2 | 1 | 0.6  | 0.34 | 2.4 | 1.05 | 37 |

The invention claimed is:

1. A process for producing a modified olefin polymer, said process comprising the steps of:

(A) combining a stream comprising a functionally unsaturated compound, wherein the functionally unsaturated compound is selected from a bifunctionally or multifunctionally unsaturated monomer or mixtures thereof, and a stream comprising a free radical generator to produce a stream of a mixture of functionally unsaturated compound and free radical generator, and passing the stream of the mixture of functionally unsaturated compound and free radical generator through a static mixer;

(B) introducing a stream comprising particles of an olefin polymer into an extruder;

(C) introducing the stream of the mixture of functionally unsaturated compound and free radical generator into the extruder;

(D) melting the particles of the olefin polymer in the extruder to produce a melt stream; and (E) extruding the melt stream at a temperature which is greater than the decomposition temperature of the free radical generator and the melting temperature of the olefin polymer but less than the decomposition temperature of the olefin polymer, thereby producing the modified olefin polymer;

wherein the step of introducing the stream of the mixture of functionally unsaturated compound and free radical generator into the extruder takes place in one of a feed zone of the extruder or a melting zone of the extruder and the mixture of the functionally unsaturated compound and free radical compound and free radical generator is thus combined with the stream comprising particles of an olefin polymer or with the melt stream;

wherein the stream of the mixture of functionally unsaturated compound and free radical generator is in liquid state and is sprayed into the feed zone of the extruder by means of an atomizing nozzle or wherein the stream of the mixture of functionally unsaturated compound and free radical generator is introduced into the melting zone of the extruder.

2. The process according to claim 1, wherein the stream of the mixture of functionally unsaturated compound and free radical generator is in liquid state and is sprayed into the feed zone of the extruder by means of an atomising nozzle.

3. The process according to claim 1, wherein the stream of the mixture of functionally unsaturated compound and free radical generator is introduced into the melting zone of the extruder.

* * * * *